(12) United States Patent
Chistyakov et al.

(10) Patent No.: US 10,878,090 B2
(45) Date of Patent: *Dec. 29, 2020

(54) SYSTEM AND METHOD OF DETECTING MALICIOUS FILES USING A TRAINED MACHINE LEARNING MODEL

(71) Applicant: AO Kaspersky Lab, Moscow (RU)

(72) Inventors: Alexander S. Chistyakov, Moscow (RU); Ekaterina M. Lobacheva, Moscow (RU); Alexey M. Romanenko, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 289 days.

This patent is subject to a terminal disclaimer.

(21) Appl. No.: 16/149,263

(22) Filed: Oct. 2, 2018

(65) Prior Publication Data
US 2019/0114420 A1    Apr. 18, 2019

Related U.S. Application Data

(60) Provisional application No. 62/573,970, filed on Oct. 18, 2017.

(51) Int. Cl.
*G06F 21/00*    (2013.01)
*G06F 21/56*    (2013.01)
(Continued)

(52) U.S. Cl.
CPC .......... *G06F 21/564* (2013.01); *G06F 21/566* (2013.01); *G06N 5/047* (2013.01); *G06N 20/00* (2019.01); *G06F 2221/034* (2013.01)

(58) Field of Classification Search
CPC ............. G06F 21/564; G06F 2221/034; G06F 21/566; G06N 5/047; G06N 99/005; G06N 20/00
See application file for complete search history.

(56) References Cited

U.S. PATENT DOCUMENTS 8,719,939 B2 *    5/2014    Krasser ................. G06F 21/564
                                                      726/24
8,726,232 B1 *    5/2014    Carrick .................... G06F 8/36
                                                      717/113
(Continued)

FOREIGN PATENT DOCUMENTS

EP         1879124 A1    1/2008
JP         2017037555 A  2/2017

OTHER PUBLICATIONS

Kolosnjaji Bojan et al: "Empowering convolutional networks for malware classification and analysis", 2017 International Joint Conference Onneural Networks (IJCNN), IEEE, May 14, 2017 (May 14, 2017), pp. 3838-3845.

*Primary Examiner* — Don G Zhao
(74) *Attorney, Agent, or Firm* — Arent Fox LLP; Michael Fainberg

(57) ABSTRACT

The present disclosure is directed to a system and method of detecting malicious files by using a trained machine learning model. The system may comprise a hardware processor configured to form at least one behavior pattern, calculate the convolution of all behavior patterns, select from a database of detection models at least two models for detection of malicious files on the basis of the behavior patterns, calculate the degree of harmfulness of a file being executed on the basis of an analysis of the convolution and the at least two models for detection of malicious files, form, on the basis of the degrees of harmfulness, a decision-making pattern, recognize the file being executed as malicious if the degree of similarity between the formulated decision-making pattern and at least one of a predetermined decision-making patterns from a database of decision-making patterns previously formulated on the basis of an analysis of malicious files, exceeds a predetermined threshold value.

18 Claims, 7 Drawing Sheets

(51) Int. Cl.
*G06N 5/04* (2006.01)
*G06N 20/00* (2019.01)

(56) References Cited

U.S. PATENT DOCUMENTS

| | | | |
|---|---|---|---|
| 9,288,220 B2 | 3/2016 | Raugas et al. | |
| 9,349,103 B2* | 5/2016 | Eberhardt, III | G06N 7/005 |
| 9,576,127 B2* | 2/2017 | Stolfo | G06F 21/56 |
| 10,284,577 B2 | 5/2019 | Feng et al. | |
| 10,318,735 B2* | 6/2019 | Saxe | H04L 63/1416 |
| 10,652,252 B2* | 5/2020 | Luan | G06F 21/566 |
| 10,726,128 B2* | 7/2020 | Krasser | G06N 7/005 |
| 10,742,591 B2* | 8/2020 | Nguyen | H04L 63/1441 |
| 2013/0097706 A1* | 4/2013 | Titonis | H04W 12/12 |
| | | | 726/24 |
| 2013/0198119 A1* | 8/2013 | Eberhardt, III | G06N 7/005 |
| | | | 706/12 |
| 2016/0337390 A1 | 11/2016 | Sridhara et al. | |
| 2017/0126027 A1* | 5/2017 | Park | G01R 31/371 |
| 2017/0193225 A1 | 7/2017 | Moon et al. | |
| 2017/0249455 A1* | 8/2017 | Permeh | H04L 63/1416 |
| 2018/0013772 A1* | 1/2018 | Schmidtler | H04L 63/145 |
| 2019/0230098 A1* | 7/2019 | Navarro | G06F 21/55 |

\* cited by examiner

SYSTEM AND METHOD OF DETECTING MALICIOUS FILES USING A TRAINED MACHINE LEARNING MODEL

CROSS-REFERENCE TO RELATED APPLICATIONS

The present application claims the benefit of priority of U.S. Provisional Application No. 62/573,970 filed on Oct. 18, 2017 which is herein incorporated by reference in its entirety.

FIELD OF TECHNOLOGY

The disclosure pertains to antivirus technologies, and more particularly to systems and methods for detection of malicious files using a trained machine learning model.

BACKGROUND

The rapid development of computer technologies in the recent decade, as well as the widespread distribution of various computing devices (personal computers, notebooks, tablets, smartphones, etc.), have become a powerful impetus to the use of such devices in various spheres of activity and for an enormous number of tasks (from Internet surfing to bank transfers and electronic document traffic). In parallel with the growth in the number of computing devices and the software running on these devices, the number of malicious programs has also increased at a rapid pace.

At present, there exists an enormous number of varieties of malicious programs. Some of them steal personal and confidential data from the users of devices (such as logins and passwords, banking information, electronic documents). Others form so-called botnets from the devices of users for such attacks as denial of service (DDoS—Distributed Denial of Service) or to sort through passwords by the method of brute force on other computers or computer networks. Still others present paid content to users through intrusive advertising, paid subscriptions, the sending of SMS to toll numbers, and so on.

Specialized programs known as antiviruses are used in the struggle against malicious programs, including the detecting of malicious programs, the preventing of infection, and the restoration of the working capability of computing devices which have been infected with malicious programs. Antivirus programs employ various technologies to detect the full variety of malicious programs, such as:
  static analysis—the analysis of programs for harmfulness, including the running or emulating of the working of the programs being analyzed, on the basis of the data contained in files making up the programs being analyzed, whereby it is possible to use during statistical analysis:
    signature analysis—the searching for correspondences of a particular segment of code of the programs being analyzed to a known code (signature) from a database of signatures of malicious programs;
    white and black lists—the search for calculated check sums of the programs being analyzed (or portions thereof) in a database of check sums of malicious programs (black lists) or a database of check sums of safe programs (white lists);
  dynamic analysis—the analysis of programs for harmfulness on the basis of data obtained in the course of execution or emulation of the working of the programs being analyzed, whereby it is possible to use during dynamic analysis:
    heuristic analysis—the emulation of the working of the programs being analyzed, the creating of emulation logs (containing data on the calls of API functions, the parameters transmitted, the code segments of the programs being analyzed, and so on) and the search for correspondences between the data of the logs created and the data from a database of behavioral signatures of malicious programs;
    proactive protection—the intercepting of calls of API functions of the launched programs being analyzed, the creating of logs of the behavior of the programs being analyzed (containing data on the calls of API functions, the parameters transmitted, the code segments of the programs being analyzed, and so on) and the search for correspondences between the data of the logs created and the data from a database of calls of malicious programs.

Both static and dynamic analysis have their pluses and minuses. Static analysis is less demanding of resources of the computing device on which the analysis is being done, and since it does not use the execution or the emulation of the program being analyzed, statistical analysis is faster, but at the same time less effective, i.e., it has a lower percentage of detection of malicious programs and a higher percentage of false alarms (i.e., pronouncing a verdict that a file analyzed by the antivirus program is malicious, whereas it is safe). Dynamic analysis, since it uses data obtained during the execution or emulation of the working of the program being analyzed, is slower and makes higher demands on the resources of the computing device on which the analysis is being performed, but on the other hand it is also more effective. Modern antivirus programs employ a comprehensive analysis, including elements of both static and dynamic analysis.

Since modern standards of computer security rely an operative response to malicious programs (especially new ones), automatic detection of malicious programs are the main focus of attention. For the effective operation of such software, one often uses elements of artificial intelligence and various methods of machine teaching of models for the detection of malicious programs (i.e., a set of rules for decision making as to the harmfulness of a file on the basis of a certain set of input data describing the malicious file), enabling an effective detection of not only well-known malicious programs or malicious programs with well-known malicious behavior, but also new malicious programs having unknown or little studied malicious behavior, as well as an operative adaptation (learning) to detect new malicious programs.

Although the above-described technology is good at detecting malicious files having certain characteristic features (i.e., data describing certain peculiarities of files from a certain group of files, such as the presence of a graphic interface, data encryption, data transmission by computer network, and so on), similar to the characteristic features of already known malicious files, it is not able to handle the detection of malicious files having characteristic features different from the characteristic features of already known malicious files (albeit similar behavior). Furthermore, the above-described technology does not disclose such aspects of machine teaching of models as testing and teaching of models, as well as training and retraining (depending on the results of the aforementioned testing) of characteristic features.

The present disclosure makes it possible to solve the problem of detection of malicious files.

SUMMARY

The disclosure is designed for antivirus scanning of files.

The technical result of the present disclosure is the detection of malicious files by using a trained model for detection of malicious files.

Yet another technical result of the present disclosure is increasing the accuracy of detection of malicious files by the use of several models for detection of malicious files, each of which has been trained for the detection of malicious files with unique, previously determined characteristic features.

Yet another result of the present disclosure is increasing the speed of detection of malicious files by the use of several models for detection of malicious files, each of which has been trained for the detection of malicious files with unique, previously determined characteristic features.

In one aspect, a system is provided for detecting malicious files by using a trained model for detection of malicious files, the system comprising a hardware processor configured to: form at least one behavior pattern on the basis of commands and parameters selected from the behavior log of a file being executed, calculate the convolution of all behavior patterns formed, select from a database of detection models at least two models for detection of malicious files on the basis of the commands and parameters selected from the behavior log of the file being executed, calculate the degree of harmfulness of a file being executed on the basis of an analysis of the convolution and the at least two models for detection of malicious files, form, on the basis of the degrees of harmfulness, a decision-making pattern, recognize the file being executed as malicious if the degree of similarity between the formulated decision-making pattern and at least one of a predetermined decision-making patterns from a database of decision-making patterns previously formulated on the basis of an analysis of malicious files, exceeds a predetermined threshold value.

In another aspect of the system, the hardware processor configured to: form the behavior logs of a file being executed, which is designed to intercept at least one command at least during the execution of the file and to emulate the execution of the file, determine, for each intercepted command, at least one parameter describing that command and form, on the basis of the intercepted commands and the determined parameters, a behavior log of that file.

In another aspect of the system, each model for detection of malicious files that is selected from the database of detection models is trained for the detection of malicious files with unique, previously determined characteristic features.

In another aspect of the system, the hardware processor is further configured to retrain at least one detection model from the database of detection models on the basis of the commands and parameters selected from the behavior log of the file being executed in the event that the degree of similarity between the formulated decision-making pattern and at least one of the predetermined decision-making patterns from the database of decision-making patterns exceeds a predetermined threshold value, and the degrees of harmfulness calculated with the aid of those detection models for a malicious file do not exceed a predetermined threshold value.

In another aspect of the system, the behavior pattern constitutes a set of at least one command and a parameter describing all the commands from the mentioned set.

In another aspect of the system, the model for detection of malicious files constitutes a decision-making rule for determining the degree of harmfulness.

In another aspect of the system, the hardware processor is further configured to form the behavior patterns by analyzing the behavior log.

In another aspect, a method is provided for detecting malicious files by using a trained model for detection of malicious files, the method comprising forming at least one behavior pattern on the basis of commands and parameters selected from the behavior log of a file being executed, calculating the convolution of all behavior patterns formed, selecting from a database of detection models at least two models for detection of malicious files on the basis of the commands and parameters selected from the behavior log of the file being executed, calculating the degree of harmfulness of a file being executed on the basis of an analysis of the convolution and the at least two models for detection of malicious files, forming, on the basis of the degrees of harmfulness, a decision-making pattern, recognizing the file being executed as malicious if the degree of similarity between the formulated decision-making pattern and at least one of a predetermined decision-making patterns from a database of decision-making patterns previously formulated on the basis of an analysis of malicious files, exceeds a predetermined threshold value.

In yet another aspect, a computer-readable medium storing instructions thereon that when executed perform the method above.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects are described herein in the context of a system, method and computer program product for detection of malicious files using a trained machine learning model. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

Malicious file—a file whose execution is known to be able to result in unauthorized destruction, blocking, modification, copying of computer information or neutralization of the protection module.

Malicious behavior of an executable file—a group of actions which may be performed during execution of that file and which are known to be able to result in unauthorized destruction, blocking, modification, copying of information or neutralization of the protection module.

Malicious activity of an executable file—a group of actions performed by that file in accordance with its malicious behavior.

Computing device of the average user—a hypothetical (theoretical) computing device having averaged characteristics of the computing devices of a previously selected group of users on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereafter: lexemes), in order to form at the output identification sequences (hereafter: tokens).

Token—an identification sequence formed from a lexeme in the process of lexical analysis.

Figure 1:
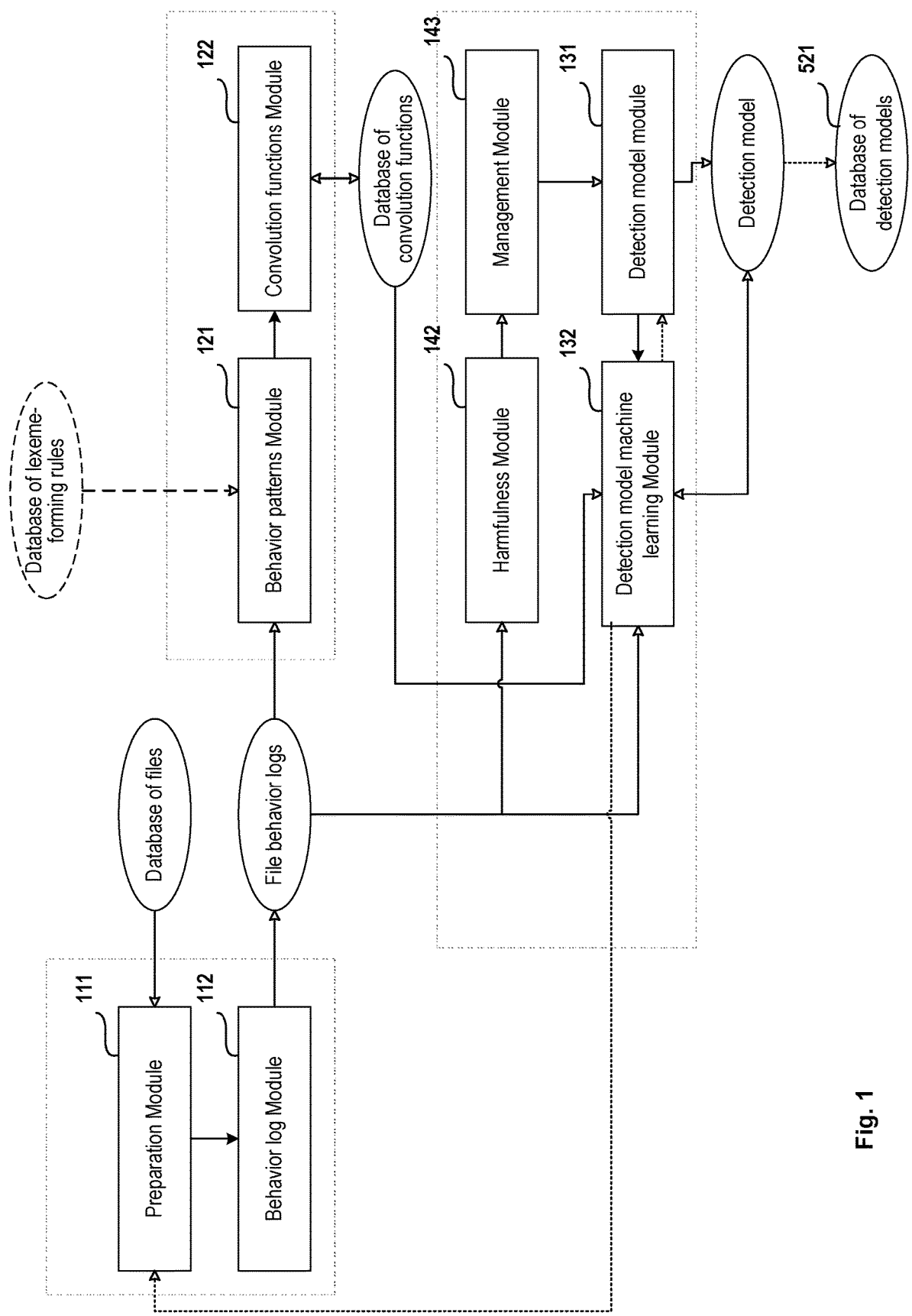
FIG. 1 shows the structural diagram of a system of machine learning of a model for detection of malicious files.

FIG. 1 shows the structural diagram of the system of machine learning of a model for detection of malicious files.

The structural diagram of the system of machine learning consists of a preparation module 111, the behavior logs module 112, a behavior patterns module 121, a convolution functions module 122, a detection model module 131, a machine learning module 132, the harmfulness module 142, and a management module 143.

In one exemplary aspect, the mentioned system of machine learning of a detection model has a client-server architecture, in which the preparation module 111, the behavior logs module 112, the behavior patterns module 121, the convolution functions module 122, the detection model module 131, and the machine learning module 132 work at the server side, and the behavior patterns module 121, the harmfulness module 142 and the management module 143 work on the client side.

For example, the client may be the computing devices of a user, such as a personal computer, notebook, smartphone, and so forth, and the server may be the computing devices of an antivirus company, such as distributed systems of servers by means of which, besides everything else, a preliminary collection and antivirus analysis of files, a creation of antivirus records, and so forth, is done, wherein the system of machine learning of a model for detection of malicious files will be used to detect malicious files at the client side, thereby enhancing the effectiveness of the antivirus protection of that client.

In yet another example, both the client and the server may be the computing devices of the antivirus company alone, wherein the system of machine learning of a model for detection of malicious files will be used for an automated antivirus analysis of files and creation of antivirus records, thereby enhancing the working effectiveness of the antivirus company.

The preparation module 111 is designed to:
 select at least one file from a database of files in accordance with predetermined rules of forming a learning selection of files, after which the machine learning module 132 will carry out the teaching of the model of detection on the basis of an analysis of the selected files;
 send the selected files to the behavior logs module 112.

In one exemplary aspect, at least one safe file and one malicious file are kept in the database of files.

For example, the database of files may keep, as safe files, the files of the operating system Windows, and as malicious files the files of backdoors, applications carrying out unauthorized access to data and remote control of an operating system and a computer as a whole. By training with the mentioned files and using methods of machine learning, the model for detection of malicious files will be able to detect malicious files having a functionality similar to the functionality of the aforementioned backdoors with high accuracy (the higher the accuracy the more files are used for the teaching of the aforementioned model of detection).

In yet another exemplary aspect, the database of files additionally keeps at least:
 suspicious files (riskware)—files which are not malicious, yet are able to carry out malicious actions;
 unknown files—files whose harmfulness has not been determined and remains unknown (i.e., files which are not safe, malicious, suspicious, and so forth).

For example, the database of files may have, as suspicious files, the application files of remote administration (such as RAdmin), archiving, or data encryption (such as WinZip), and so on.

In yet another exemplary aspect, the database of files keeps at least files:
 collected by antivirus web crawlers;
 sent in by users.

The mentioned files are analyzed by antivirus experts, including with the help of automatic file analysis, in order to then pronounce a verdict as to the harmfulness of such files.

For example, the database of files may keep files sent in by users from their computing devices to the antivirus companies for a checking of their harmfulness, in which case the files transmitted may be either safe or malicious, and the distribution between the number of said safe and malicious files is close to the distribution between the number of all safe and malicious files located on the computing devices of said users (i.e., the ratio of the number of said safe files to the number of said malicious files differs from the ratio of the number of all safe files to the number of all malicious files located on the computing devices of said users by a quantity less than a specified threshold value $$\left| \frac{N_{clean}}{N_{malware}} - \frac{\forall N_{clean}}{\forall N_{malware}} \right| < \varepsilon$$

Unlike the files transmitted by the users (i.e., files which are subjectively suspicious), the files collected by antivirus web crawlers which are designed to search for suspicious and malicious files more often prove to be malicious.

In yet another exemplary aspect, at least one of the conditions is used as the criteria for selecting files from the database of files:
- the distribution between safe and malicious files selected from the database of files corresponds to the distribution between safe and malicious files located on the computing device of the average user;
- the distribution between safe and malicious files selected from the database of files corresponds to the distribution between safe and malicious files collected with the help of antivirus web crawlers;
- the parameters of the files selected from the database of files correspond to the parameters of the files located on the computing device of the average user;
- the number of selected files corresponds to a predetermined value, while the files themselves are selected at random.

For example, the database of files contains 100000 files, among which 40% are safe files and 60% are malicious files. From the database of files there are selected 15000 files (15% of the total number of files being kept in the database of files) such that the distribution between the selected safe and malicious files corresponds to the distribution between the safe and the malicious files located on the computing device of the average user and amounts to 95 to 5. For this purpose, 14250 safe files (35.63% of the total number of safe files) and 750 malicious files (1.25% of the total number of malicious files) are chosen at random from the database of files.

In yet another example, the database of files contains 1250000 files, of which 95% are safe files and 5% are malicious files, i.e., the distribution between the safe and malicious files being kept in the database of files corresponds to the distribution between the safe and the malicious files located on the computing device of the average user. Of these files, 5000 files are chosen at random, of which ~4750 prove to be safe files and ~250 malicious files with a high probability.

In yet another exemplary aspect, the file parameters are at least:
- the harmfulness of the file, characterizing whether the file is safe, malicious, potentially dangerous, or the behavior of the computing system when executing the file is not determined, and so forth;
- the number of commands performed by the computing device during the execution of the file;
- the size of the file;
- the applications utilizing the file.

For example, malicious files are chosen from the database of files which are scripts in the "ActionScript" language, executable by the application "Adobe Flash", and not exceeding 5 kb in size.

In yet another exemplary aspect, the preparation module 111 is additionally designed to:
- select at least one other file from the database of files in accordance with predetermined rules of forming a test selection of files, after which the machine learning module 132 will carry out a verification of the trained model of detection on the basis of an analysis of the selected files;
- send the selected files to the behavior logs module 112.

For example, the database of files contains 75000 files, among which 20% are safe files and 80% are malicious files. First of all, 12500 files are chosen from the database of files, of which 30% are safe files and 70% are malicious files, after which the machine learning module 132 will perform a teaching of the model of detection on the basis of an analysis of the selected files, and then select 2500 files from the remaining 62500 files, of which 60% are safe files and 40% are malicious files, and after this the machine learning module 132 will perform a checking of the trained model of detection on the basis of an analysis of the selected files. The data formulated in the above-described way is called the cross-validation set of data.

The behavior logs module 112 is designed to:
- intercept at least one executable command at least during:
  - the execution of the file received,
  - the emulation of the execution of the file received, wherein the emulation of the execution of the file includes the opening of the mentioned file (for example, the opening of a script by an interpreter);
- determine for each intercepted command at least one parameter describing said command;
- form the behavior log of the obtained file on the basis of the intercepted commands and the parameters so determined, wherein the behavior log constitutes the totality of intercepted commands (hereinafter, the command) from the file, where each command corresponds at least to one parameter so determined and describing that command (hereinafter, the parameter).

For example, the commands intercepted during the execution of a malicious file which collects passwords and transmits them via a computer network and the parameters calculated for said commands may look like:

```
CreateFile, 'c:\windows\system32\data.pass'
ReadFile, 0x14ea25f7, 0xf000
connect, http://stealpass.com
send, 0x14ea25f7, 0xf000
```

In one exemplary aspect, the intercepting of commands from the file is done with the aid of at least:
- a specialized driver;
- a debugger;
- a hypervisor.

For example, the intercepting of commands during the execution of the file and the determination of their parameters are done with the aid of a driver which utilizes an interception by splicing of the entry point of a WinAPI function.

In yet another example, the intercepting of commands during the emulation of the working of a file is done directly by the emulator performing said emulation, which determines the parameters of the command needing to be emulated.

In yet another example, the intercepting of commands during the execution of the file on a virtual machine is done by hypervisor, which determines the parameters of the command needing to be emulated.

In yet another exemplary aspect, the intercepted commands from the file are at least:
- API functions;
- sets of machine instructions describing a predetermined set of actions (macro commands).

For example, malicious programs very often perform a search for certain files and modify their attributes, for which they employ a sequence of commands such as:

```
FindFirstFile, 'c:\windows\system32\*.pass', 0x40afb86a
SetFileAttributes, 'c:\windows\system32\data.pass'
FindNextFile, 0x40afb86a
CloseHandle, 0x40afb86a
``` which may in turn be described by only a single command _change_attributes, 'c:\windows\system32\*.pass'

In yet another exemplary aspect, each command is matched up with its unique identifier.

For example, all WinAPI functions may be matched up with numbers in the range of 0x0000 to 0x8000, where each WinAPI function corresponds to a unique number (for example, ReadFile→0x00f0, ReadFileEx→0x00f1, connect→0x03A2).

In yet another exemplary aspect, several commands describing similar actions are matched up with a single identifier.

For example, all commands such as ReadFile, ReadFileEx, ifstream, getline, getchar and so forth, which describe a reading of data from a file, are matched up with an identifier _read_data_file (0x70F0).

The behavior patterns module 121 is designed to:
form at least one behavior pattern on the basis of the commands and parameters selected from the behavior log, wherein the behavior log constitutes the totality of executable commands (hereinafter, the command) from the file, where each command corresponds at least to one parameter describing that command (hereinafter, the parameter), the behavior pattern being a set of at least one command and a parameter which describes all of the commands of that set (hereinafter, the elements of the behavior pattern);
send the behavior patterns so formed to the convolution functions module 122.

For example, from the behavior log the following commands $c_i$ and parameters $p_i$ are selected:
$\{c_1,p_1,p_2,p_3\}$,
$\{c_2,p_1,p_4\}$,
$\{c_3,p_5\}$,
$\{c_2,p_5\}$,
$\{c_1,p_5,p_6\}$,
$\{c_3,p_2\}$.

On the basis of the selected commands and parameters, behavior patterns are formed containing one command each and one parameter describing that command:
$\{c_1,p_1\}$, $\{c_1,p_2\}$, $\{c_1,p_3\}$, $\{c_1,p_5\}$, $\{c_1,p_6\}$,
$\{c_2,p_1\}$, $\{c_2,p_4\}$, $\{c_2,p_5\}$,
$\{c_3,p_2\}$, $\{c_3,p_5\}$.

Next, on the basis of the patterns so formed, additional behavior patterns are formed, containing one parameter each and all the commands which can be described by that parameter:
$\{c_1,c_2,p_1\}$,
$\{c_1,c_3,p_2\}$,
$\{c_1,c_2,c_3,p_5\}$.

After this, on the basis of the patterns so formed, additional behavior patterns are formed, containing several parameters each and all the commands which can be described by those parameters at the same time:
$\{c_1,c_2,p_1,p_5\}$.

In one exemplary aspect, the commands and parameters are chosen from the behavior log on the basis of rules by which are selected at least:
every i-th command in succession and the parameters describing it, the increment i being specified in advance;
the commands executed after a predetermined period of time (for example, every tenth second) from the previous selected command, and the parameters describing them;
the commands and the parameters describing them that are executed in a predetermined time interval from the start of execution of the file;
the commands from a predetermined list and the parameters describing them;
the parameters from a predetermined list and the commands described by those parameters;
the first or the random k parameters of commands in the case when the number of command parameters is greater than a predetermined threshold value.

For example, from the behavior log one selects all the commands for working with a hard disk (such as CreateFile, ReadFile, WriteFile, DeleteFile, GetFileAttribute and so on) and all the parameters describing the selected commands.

In yet another example, from the behavior log one selects every thousandth command and all the parameters describing the selected commands.

In one exemplary aspect, the behavior logs are formed in advance from at least two files, one of which is a safe file and the other a malicious file.

In yet another exemplary aspect, each element of the behavior pattern is matched up with a characteristic such as the type of element of the behavior pattern. The type of element of the behavior pattern (command or parameter) is at least:
a "number range", if the element of the behavior pattern can be expressed as a number,
for example, for an element of the behavior pattern constituting the parameter $port_{html}=80$ of the connect command, the type of said element of the behavior pattern may be the "number range from 0x0000 to 0xFFFF",
a "string", if the element of the behavior pattern can be expressed in the form of a string,
for example, for an element of the behavior pattern constituting the connect command, the type of said element of the behavior pattern may be a "string less than 32 characters in size",
if the element of the behavior pattern can be expressed in the form of data described by a predetermined data structure, the type of that element of the behavior pattern may be a "data structure",
for example, for an element of a behavior pattern constituting the parameter src=0x336b9a480d490982cdd93e2e49fdeca7 of the find-_record command, the type of this element of the behavior pattern may be the "data structure MD5".

In yet another exemplary aspect, the behavior pattern additionally includes, as elements of the behavior pattern, tokens formed on the basis of lexical analysis of said elements of the behavior pattern with the use of at least:
predetermined rules for the formation of lexemes,
a previously trained recurrent neural network.

For example, with the aid of lexical analysis of the parameter
'c:\windows\system32\data.pass'
on the basis of the rules for the formation of lexemes:
if the string contains the path to a file, determine the disk on which the file is located;
if the string contains the path to a file, determine the folders in which the file is located;
if the string contains the path to a file, determine the file extension;

where the lexemes are:
the paths to the file;
the folders in which the files are located;
the names of the files;
the extensions of the files;
the tokens can be formed:

---

"paths to the file" →
  'c:\',
"folders in which the files are located" →
  'windows',
  'system32',
  'windows\system32',
"extensions of the files" →
  '.pass'.

---

In yet another example, with the aid of lexical analysis of the parameters
'81.19.82.8', '81.19.72.38', '81.19.14.32'
on the basis of the rule for the formation of lexemes:
if the parameters constitute IP addresses, determine the bit mask (or its analog, expressed by metacharacters) describing said IP addresses (i.e., the bit mask M for which the equality M∧IP=const is true for all said IPs);
the token can be formulated:
'81.19.*.*'.

In yet another example, from all available parameters comprising numbers, the tokens of the numbers are formed in predetermined ranges:
23, 16, 7224, 6125152186, 512, 2662162, 363627632, 737382, 52, 2625, 3732, 812, 3671, 80, 3200
and sorting is done by ranges of numbers:
from 0 to 999
  →{16, 23, 52, 80, 512, 812},
from 1000 to 9999
  →{2625, 3200, 3671, 7224},
from 10000
  →{737382, 2662162, 363627632, 6125152186}

In yet another exemplary aspect, tokens are formed from elements of a behavior pattern which consist of strings.

For example, the behavior pattern is a path to a file containing the names of the disk, the directory, the file, the file extension, and so forth. In this case, the token may be the name of the disk and the file extension.

---

C:\Windows\System32\drivers\acpi.sys
→
C:\
*.sys

---

The convolution functions module 122 is designed to:
form a convolution function from the behavior pattern such that the inverse convolution function of the result of that convolution function on the obtained behavior pattern will have a degree of similarity with the obtained behavior pattern greater than a specified value, i.e.

$r \sim g^{-1}(g(r))$ where:
$r_i$ is the behavior pattern,
g is the convolution function,
$g^{-1}$ is the inverse convolution function;
send the convolution function so formed to the machine learning module 132.
In one exemplary aspect, the convolution functions module 122 is additionally designed to:

calculate the feature vector of a behavior pattern on the basis of the obtained behavior pattern, wherein the feature vector of the behavior pattern may be expressed as the sum of the hash sums of the elements of the behavior pattern;
form a convolution function from the feature vector of the behavior pattern, where the convolution function constitutes a hash function such that the degree of similarity between the calculated feature vector and the result of the inverse hash function of the result of that hash function of the calculated feature vector is greater than a predetermined value.

In yet another exemplary aspect, the convolution function is formed by the metric learning method, i.e., such that the distance between the convolutions obtained with the aid of said convolution function for behavior patterns having a degree of similarity greater than a predetermined threshold value is less than a predetermined threshold value, while for behavior patterns having a degree of similarity less than the predetermined threshold value it is greater than the predetermined threshold value.

For example, the feature vector of the behavior pattern may be calculated as follows:
first an empty bit vector is created, consisting of 100000 elements (where one bit of information is reserved for each element of the vector);
1000 elements from the behavior pattern r are set aside for storing of data about the commands $c_i$, the remaining 99000 elements being set aside for the parameters $c_i$ of the behavior pattern r, wherein 50000 elements (from element 1001 to element 51000) are set aside for string parameters and 25000 elements (from element 51001 to element 76000) for number parameters;
each command $c_i$ of the behavior pattern r is matched up with a certain number $x_i$ from 0 to 999, and the corresponding bit is set in the vector so created $v[x_i]$=true;

for each parameter $p_i$ of the behavior pattern r the hash sum is calculated by the formula:

for strings: $y_i$=1001+$crc32(p_i)$(mod 50000)

for numbers: $y_i$=51001+$crc32(p_i)$(mod 25000)

for others: $y_i$=76001+$crc32(p_i)$(mod 24000), and depending on the calculated hash sum the corresponding bit is set in the created vector $v[y_i]$=true.

The described bit vector with the elements so set constitutes the feature vector of the behavior pattern r.

In yet another exemplary aspect, the feature vector of the behavior pattern is computed by the following formula:

$$D = \sum_i b^i \times h(r_i)$$

where:
b is the base of the positional system of computation (for example, for a binary vector b=2, for a vector representing a string, i.e., a group of characters, b=8),
$r_i$ is the i-th element of the behavior pattern,
h is the hash function, where $0 \leq h(r_i) < b$.

For example, the feature vector of the behavior pattern may be computed as follows:
  first create yet another empty bit vector (different from the previous example), consisting of 1000 elements (where one bit of information is reserved for each element of the vector);
  calculate the hash sum for each pattern element $r_i$ of the behavior pattern r by the formula:

$$x_i = 2^{crc32(r_i)(mod\ 1000)},$$

and depending on the computed hash sum, set the corresponding bit in the created vector $$v[x_i] = true.$$

In yet another exemplary aspect, the feature vector of the behavior pattern constitutes a Bloom filter.

For example, the feature vector of the behavior pattern may be computed as follows:
  first create yet another empty vector (different from the previous examples), consisting of 100000 elements;
  calculate at least two hash sums for each pattern element $r_i$ of the behavior pattern r using a set of hash functions $\{h_j\}$ by the formula:

$$x_{ij} = h_j(r_i)$$

where:

$$h_j(r_i) = crc32(r_i),$$

$$h_j(0) = const_j,$$

and depending on the computed hash sums, set the corresponding elements in the created vector $$v[x_{ij}] = true.$$

In yet another exemplary aspect, the size of the result of the formulated convolution function of the feature vector of the behavior pattern is less than the size of said feature vector of the behavior pattern.

For example, the feature vector constitutes a bit vector containing 100000 elements, and thus having a size of 12500 bytes, while the result of the convolution function of said feature vector constitutes a set of 8 MD5 hash sums and thus has a size of 256 bytes, i.e., ~2% of the size of the feature vector.

In yet another exemplary aspect, the degree of similarity between the feature vector and the result of the inverse hash function of the result of said hash function of the calculated feature vector constitutes a number value in the range of 0 to 1 and is calculated by the formula:

$$w = \frac{\sum (\{h(r_i)\} \wedge \{g_i\})}{\sum \{h(r_i)\}}$$

$$\{h(r_i)\} \wedge \{g_i\} \vee \{h(r_i)\} = \{g_i\}$$

where:
$h(r_i) \wedge g_i$ signifies the concurrence of $h(r_i)$ with $g_i$
и
$\{h(r_i)\}$ is the set of results of the hash functions of the elements of the behavior pattern,
$\{g_i\}$ is the set of results of the inverse hash function of the result of the hash function of the elements of the behavior pattern,
$r_i$ is the i-th element of the behavior pattern,
h is the hash function,
w is the degree of similarity.

For example, the calculated feature vector constitutes the bit vector:
"101011100110010010110111011111101000100011001001001001110101101101010 01100110110100100010000001011101110011011011," the result of the convolution function of this feature vector is: "1010011110101110101," and the result of the inverse convolution function of the above-obtained result is:
"101011100100010010110111100111110100010001100100010100011101011011011100 01100110110100000010000001011101110011011011"
(where the bolding denotes elements different from the feature vector). Thus, the similarity of the feature vector and the result of the inverse convolution function is 0.92.

In yet another exemplary aspect, the aforementioned hash function using an element of the behavior pattern as a parameter depends on the type of element of the behavior pattern:

$$h(r_i) = h_{r_i}(r_i).$$

For example, in order to compute the hash sum of a parameter from the behavior pattern constituting a string containing the path to the file, we use the hash function CRC32; for any other string—the Huffman algorithm; for a data set, the hash function MD5.

In yet another exemplary aspect, the forming of the convolution function of the feature vector of a behavior pattern is done by an autoencoder, where the input data are the elements of that feature vector of the behavior pattern, and the output data are data having a coefficient of similarity to the input data greater than a predetermined threshold value.

The detection model module 131 is designed to:
  create a model for detection of malicious files, including at least:
    selection of a method of machine learning of the detection model;
    initialization of the parameters of the teaching model, where the parameters of the teaching model initialized prior to the start of the machine learning of the detection model are known as hyperparameters;
  in dependence on the parameters of the files selected by the preparation module 111;
  send the teaching model so created to the machine learning module 132.

For example, when selecting the method of machine learning of the detection model, at first a decision is made whether to use as the detection model an artificial neural net or a random forest, and then if the random forest is chosen, one selects the separating criterion for the nodes of the random forest; or if an artificial neural net is chosen, one selects the method of numerical optimization of the parameters of the artificial neural net. The decision as to the choice of a particular method of machine learning is made on the basis of the effectiveness of that method in the detecting of malicious files (i.e., the number of errors of the first and second kind occurring in the detecting of malicious files) with the use of input data (behavior patterns) of predetermined kind (i.e., the data structure, the number of elements of the behavior patterns, the performance of the computing device on which the search is conducted for malicious files, the available resources of the computing device, and so on).

In yet another example, the method of machine learning of the detection model is selected on the basis of at least:
  cross testing, sliding check, cross-validation (CV);
  mathematical validation of the criteria AIC, BIC and so on;
  A/B testing, split testing;
  stacking.

In yet another example, in the event of low performance of the computing device, the random forest is chosen, otherwise the artificial neural net is chosen.

In one exemplary aspect, machine learning is performed for a previously created untrained detection model (i.e., a detection model in which the parameters of that model cannot produce, on the basis of analysis of the input data, output data with accuracy higher than a predetermined threshold value).

In yet another exemplary aspect, the method of machine learning of the detection model is at least:
  decision-tree-based gradient boosting;
  decision trees;
  the K-nearest neighbor method;
  the support vector machine (SVM).

In yet another exemplary aspect, the detection model module 131 is additionally designed to create a detection model on demand from the machine learning module 132, where certain hyperparameters and methods of machine learning are chosen to be different from the hyperparameters and methods of machine learning chosen for a previous detection model.

The machine learning module 132 is designed to teach the detection model, in which the parameters of the detection model are computed with the use of the obtained convolution function on the obtained behavior patterns, where the detection model constitutes a set of rules for computing the degree of harmfulness of a file on the basis of at least one behavior pattern with the use of the computed parameters of said detection model.

For example, the detection model is trained with a known set of files selected by the preparation module 111, wherein said set of files contains 60% safe files and 40% malicious files.

In one exemplary aspect, the degree of harmfulness of a file constitutes a numerical value from 0 to 1, where 0 means that said file is safe, and 1 that it is malicious.

In yet another exemplary aspect, a method of teaching of the detection model is chosen which ensures a monotonic change in the degree of harmfulness of a file in dependence on the change in the number of behavior patterns formed on the basis of analysis of the behavior log.

For example, a monotonic change in the degree of harmfulness of a file means that, upon analyzing each subsequent behavior pattern, the calculated degree of harmfulness will be not less than the previously calculated degree of harmfulness (for example, after analysis of the 10th behavior pattern, the calculated degree of harmfulness is equal to 0.2; after analysis of the 50th behavior pattern, it is 0.4; and after analysis of the 100th behavior pattern, it is 0.7).

In yet another exemplary aspect, the machine learning module 132 is additionally designed to:
  perform a check of the trained detection model on the obtained behavior logs formed on the basis of analysis of files from a test selection of files, in order to determine the correct determination of the harmfulness of files from the test selection of files;
  in the event of a negative result of the check, send a request at least:
    to the preparation module 111 to prepare a selection of files different from the current one used for the teaching of the detection model;
    to the detection model module 131 to create a new detection model, different from the current one.

The checking of the trained detection model involves the following. Said detection model has been taught on the basis of a set of files selected by the preparation module 111 for which it was known whether they are safe or malicious. In order to verify that the model for detection of malicious files has been trained correctly, i.e., that detection model is able to detect malicious files and pass over safe files, a checking of this model is performed. For this purpose, said detection model is used to determine whether files from another set of files selected by the preparation module 111 are malicious, it being known in advance whether those files are malicious. Thus, one determines how many malicious files were "missed" and how many safe files were detected. If the number of missed malicious files and detected safe files is greater than a predetermined threshold value, that detection model is considered to be improperly trained and a repeat machine learning needs to be done for it (for example, on another training selection of files, using values of the parameters of the detection model different from the previous ones, and so forth).

For example, when performing the check for the trained model one checks the number of errors of the first and second kind in the detecting of malicious files from a test selection of files. If the number of such errors is greater than a predetermined threshold value, a new teaching and testing selection of files is selected and a new detection model is created.

In yet another example, the teaching selection of files contained 10000 files, of which 8500 were malicious and 1500 were safe. After the detection model was taught, it was checked on a test selection of files containing 1200 files, of which 350 were malicious and 850 were safe. According to the results of the check performed, 15 out of 350 malicious files failed detection (4%), while 102 out of 850 safe files (12%) were erroneously considered to be malicious. In the event that the number of undetected malicious files exceeds 5% or randomly detected safe files exceeds 0.1%, the trained detection model is considered to be improperly trained.

In one exemplary aspect, the behavior log of the system is additionally formed on the basis of a previously formed behavior log of the system and commands intercepted after the forming of said behavior log of the system.

For example, after the start of the execution of a file for which it is necessary to pronounce a verdict as to the harmfulness or safety of that file, the intercepted executable commands and the parameters describing them are recorded in the behavior log. On the basis of an analysis of these commands and parameters, a degree of harmfulness of that file is calculated. If no verdict was pronounced as to the file being malicious or safe based on the results of the analysis, the intercepting of commands may be continued. The intercepted commands and the parameters describing them are recorded in the old behavior log or in a new behavior log. In the first case, the degree of harmfulness is calculated on the basis of an analysis of all commands and parameters recorded in the behavior log, i.e., even those previously used to calculate the degree of harmfulness.

The harmfulness module 142 is designed to:
  calculate the degree of harmfulness on the basis of the behavior log obtained from the behavior logs module 112 and the detection model obtained from the machine learning module 132, the degree of harmfulness of a file being a quantitative characteristic (for example, lying in the range from 0—the file has only safe behavior—to 1—said file has predetermined malicious behavior), describing the malicious behavior of the executable file;
  send the calculated degree of harmfulness to the management module 143.

The management module 143 is designed to allocate computing resources of the computer system on the basis of the analysis of the obtained degree of harmfulness for use in assuring the security of the computer system.

In one exemplary aspect, the computing resources of the computer system include at least:
- the volume of free RAM;
- the volume of free space on the hard disks;
- the free processor time (quanta of processor time) which can be spent on the antivirus scan (for example, with a greater depth of emulation).

In yet another exemplary aspect, the analysis of the degree of harmfulness consists in determining the dynamics of the change in the value of the degree of harmfulness after each of the preceding calculations of the degree of harmfulness and at least:
- allocating additional resources of the computer system in the event of an increase in the value of the degree of harmfulness;
- freeing up previously allocated resources of the computer system in the event of a decrease in the value of the degree of harmfulness.

Figure 2:
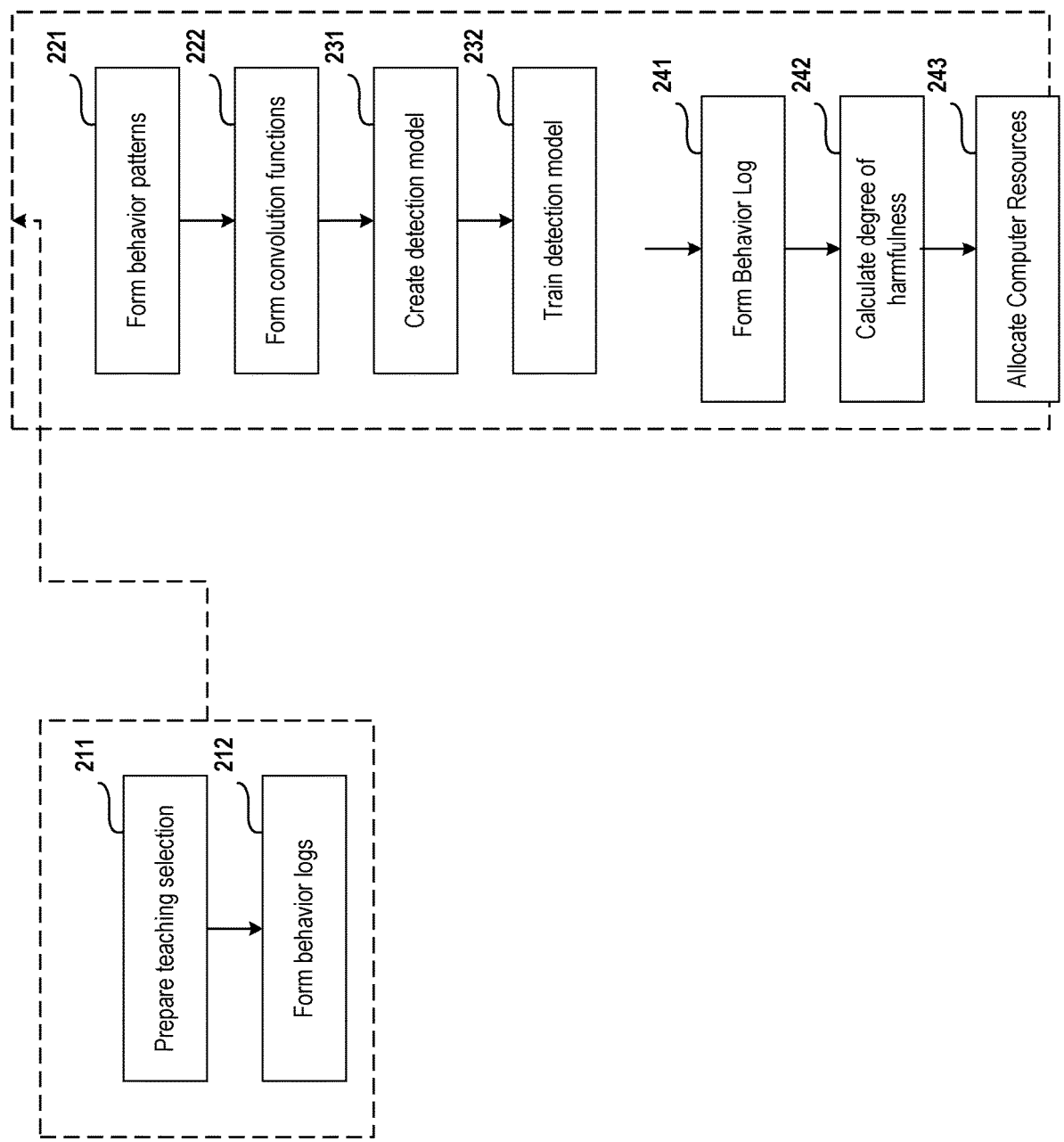
FIG. 2 shows the structural diagram of the method of machine learning of a model for detection of malicious files.

FIG. 2 shows the structural diagram of the method of machine learning of a model for detection of malicious files.

The structural diagram of the method of machine learning of a model for detection of malicious files contains a step 211 in which teaching selections of files are prepared, a step 212 in which behavior logs are formed, a step 221 in which behavior patterns are formed, a step 222 in which convolution functions are formed, a step 231 in which a detection model is created, a step 232 in which the detection model is trained, a step 241 in which the behavior of the computer system is tracked, a step 242 in which the degree of harmfulness is calculated, and a step 243 in which the resources of the computer system are managed.

In step 211, the preparation module 111 is used to select at least one file from a database of files according to predetermined criteria, wherein the teaching of the detection model will be done in step 232 on the basis of the selected files.

In step 212, the behavior logs module 112 is used:
- to intercept at least one command at least during:
  - the execution of the file selected in step 211,
  - the emulation of the working of the file selected in step 211;
- to determine for each intercepted command at least one parameter describing that command;
- to form, on the basis of the commands intercepted and the parameters determined, a behavior log of the obtained file, wherein the behavior log represents a set of intercepted commands (hereinafter, the command) from the file, where each command corresponds to at least one defined parameter describing that command (hereinafter, the parameter).

In step 221, the behavior patterns module 121 is used to form at least one behavior pattern on the basis of the commands and parameters selected from the behavior log formed in step 212, where the behavior log represents the group of executable commands (hereinafter, the command) from the file, where each command corresponds to at least one parameter describing that command (hereinafter, the parameter), the behavior pattern being a set of at least one command and a parameter which describes all the commands from that set.

In step 222, the convolution functions module 122 is used to form a convolution function of the behavior pattern formed in step 221 so that the inverse convolution function of the result of this convolution function on the aforementioned behavior pattern will have a degree of similarity to the aforementioned behavior pattern greater than a specified value.

In step 231, the detection model module 131 is used to create a detection model, for which at least:
- a method of machine learning of the detection model is selected;
- the parameters of the teaching model are initialized, where the parameters of the teaching model initialized prior to the start of the machine learning of the detection model are known as hyperparameters;
- in dependence on the parameters of the files selected in step 211.

In step 232, the machine learning module 132 is used to teach the detection model created in step 231, in which the parameters of that detection model are calculated with the use of the convolution function formed in step 222, on the behavior patterns formed in step 221, where the detection model where the detection model constitutes a group of rules for calculating the degree of harmfulness of a file on the basis of at least one behavior pattern with the use of the calculated parameters of that detection model.

In step 241, a behavior logs module 112 is used:
- to intercept at least one command being executed by the files running in the computer system;
- to form a behavior log of the system on the basis of the intercepted commands.

In step 242, the harmfulness module 142 is used to calculate the degree of harmfulness on the basis of the behavior log of the system, formed in step 241, and the detection model which has been trained in step 232.

In step 243, the management module 143 is used to allocate computing resources on the basis of the analysis of the degree of harmfulness as calculated in step 242, for use in assuring the security of the computer system.

Figure 3:
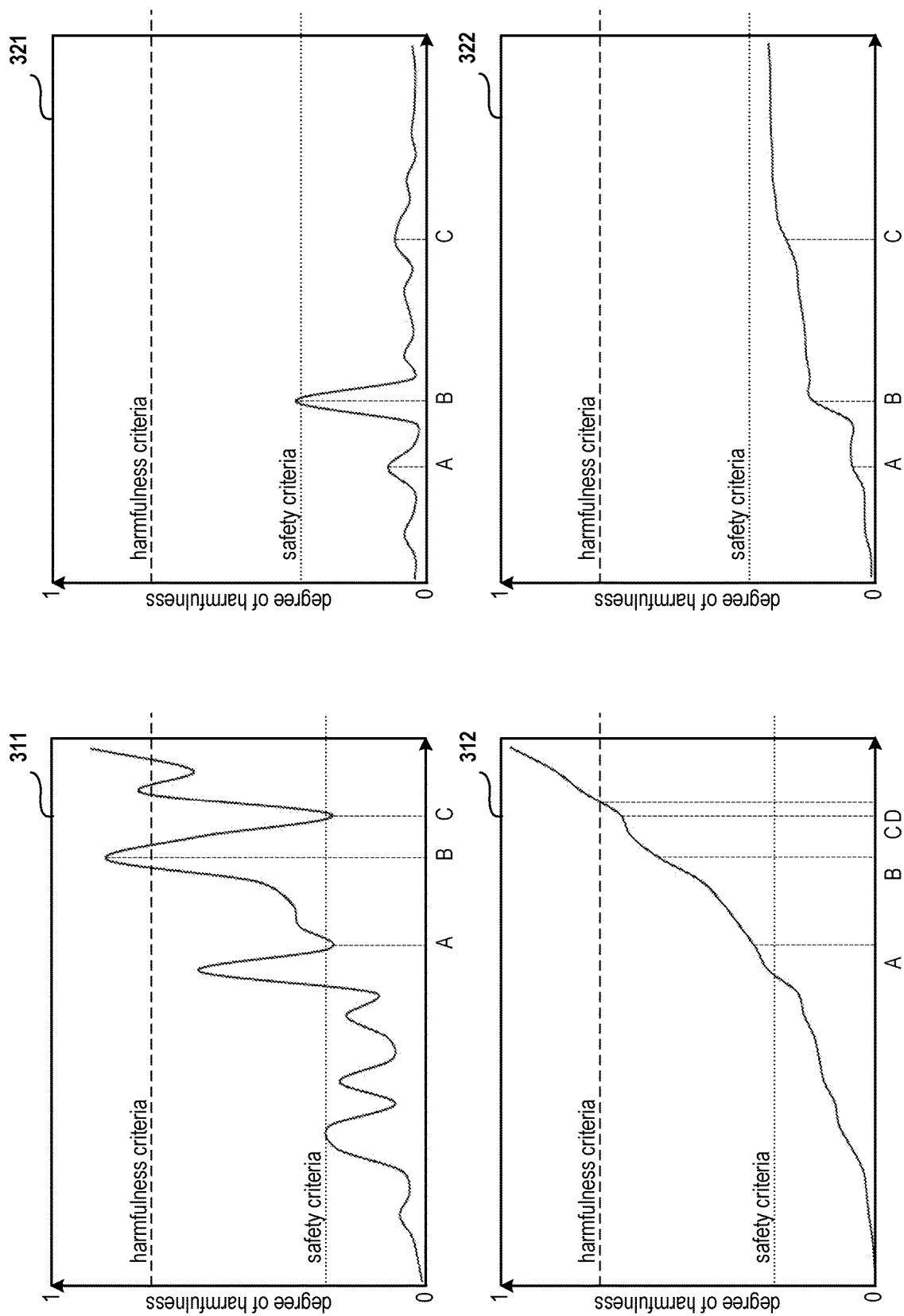
FIG. 3 shows examples of the dynamics of changing the degree of harmfulness as a function of the number of behavior patterns.

FIG. 3 shows examples of the dynamics of changing the degree of harmfulness as a function of the number of behavior patterns.

The examples of the dynamics of changing the degree of harmfulness as a function of the number of behavior patterns contain a graph 311 of the dynamics of an arbitrary change in the degree of harmfulness as a function of the number of behavior patterns formed during the execution of a malicious file, a graph 312 of the dynamics of a monotonic change in the degree of harmfulness as a function of the number of behavior patterns formed during the execution of a malicious file, a graph 321 of the dynamics of an arbitrary change in the degree of harmfulness as a function of the number of behavior patterns formed during the execution of a safe file, and a graph of the dynamics of a monotonic change in the degree of harmfulness as a function of the number of behavior patterns formed during the execution of a safe file 322.

In one exemplary aspect, the degree of harmfulness of an executable file takes on a value in the range of 0 (said file has absolutely safe behavior) to 1 (said file has predetermined malicious behavior).

The graph 311 shows the dynamics of an arbitrary change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs, which is natural to many files, including safe ones), so that the calculated degree of harmfulness differs slightly from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows and the degree of harmfulness begins to approach 1, surpassing the criterion of safety, while the degree of harmfulness might not reach the predetermined threshold value (hereinafter, the criterion of harmfulness), after the passing of which the behavior of the executable file will be considered to be malicious (in the graph, this threshold value is designated by a dashed line).

After a period of growth, the malicious activity may cease and the degree of harmfulness will again tend toward 0 (time A). At a certain time, the degree of harmfulness will become greater than the criterion of harmfulness (time B) and the behavior of the executable file will be recognized as malicious and in consequence the file itself will be recognized as malicious.

The time of recognizing the file as malicious might occur significantly later than the start of growth in malicious activity, since the described approach responds well to an abrupt growth in the degree of harmfulness, which occurs most often during prolonged, clearly manifested malicious activity of the executable file.

In the event that the malicious activity occurs episodically (left side of the graph 311), the calculated degree of harmfulness might not reach the value after which a verdict is pronounced as to the harmfulness of the behavior of the executable file, and consequently the harmfulness of the executable file itself.

In the case when the degree of harmfulness is calculated not on the basis of each behavior pattern formed (for example, because the performance of the computing device is low), a situation is possible where the degree of harmfulness will be calculated at time A (when the malicious activity commences) and time C (when the malicious activity is finished), but will not be calculated at time B (when malicious activity is occurring), so that the calculated degrees of harmfulness will not exceed the criterion of harmfulness, the activity of the executable file will not be recognized as malicious, and consequently the malicious file will not be detected.

The graph 312 shows the dynamics of a monotonic change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs, which is natural to many files, including safe ones), so that the calculated degree of harmfulness differs slightly from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows and the degree of harmfulness begins to approach 1, surpassing the criterion of safety, while the degree of harmfulness might not reach the predetermined threshold value (hereinafter, the criterion of harmfulness), after the passing of which the behavior of the executable file will be considered to be malicious (in the graph, this threshold value is designated by a dashed line).

After a period of growth (times A-B), the malicious activity may cease (times B-A) yet the degree of harmfulness will not decline, but only continue to grow during any malicious activity of the executable file. At a certain time, the degree of harmfulness will become greater than the criterion of harmfulness (time D) and the behavior of the executable file will be recognized as malicious and in consequence the file itself will be recognized as malicious.

The time of recognizing the file as malicious might occur immediately after the manifesting of malicious activity, since the described approach responds well to a smooth growth in the degree of harmfulness, which occurs both during prolonged, clearly manifested malicious activity of the executable file, and during frequent, episodic, less-pronounced malicious activity.

In the event that the malicious activity occurs episodically (left side of the graph 312), the calculated degree of harmfulness over time might reach the value after which a verdict is pronounced as to the harmfulness of the behavior of the executable file and the harmfulness of the executable file itself.

In the case when the degree of harmfulness is calculated not on the basis of each behavior pattern formed (for example, because the performance of the computing device is low), a situation is possible where the degree of harmfulness will be calculated at time A (when the malicious activity commences) and time C (when the malicious activity is finished), but will not be calculated at time B (when malicious activity is occurring); nevertheless since the degree of harmfulness changes monotonically, the calculated degrees of harmfulness will only increase their values and at time C the degree of harmfulness will exceed the criterion of harmfulness, the activity of the executable file will be recognized as malicious, and consequently the malicious file will be detected.

The graph 321 shows the dynamics of an arbitrary change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), after the passing of which the behavior of the executable file will be considered to be malicious (in the graph, this threshold value is designated by a dashed line), but it might exceed the criterion of safety, so that the file may cease to be considered safe and become "suspicious".

After a period of growth, the malicious activity may cease and the degree of harmfulness will again tend toward 0 (time C).

In the case when the degree of harmfulness is calculated not on the basis of each behavior pattern formed (for example, because the performance of the computing device is low), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing), so that the calculated degrees of harmfulness will exceed the criterion of safety, the activity of the executable file will be recognized as "suspicious" (it will not be considered safe), and consequently the safe file will not be recognized as safe.

The graph 322 shows the dynamics of a monotonic change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), after the passing of which the behavior of the executable file will be considered to be malicious (in the graph, this threshold value is designated by a dashed line), and also it might not exceed the criterion of safety, so that the file will continue to be considered safe.

After a period of growth (times A-B), the malicious activity may cease (times B-A) yet the degree of harmfulness will not decline, but only continue to grow during any malicious activity of the executable file, yet not exceed the coefficient of safety, so that the activity of the executable file will be recognized as safe and in consequence said file will be recognized as safe.

In the case when the degree of harmfulness is calculated not on the basis of each behavior pattern formed (for example, because the performance of the computing device is low), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing); nevertheless since the degree of harmfulness changes monotonically, the calculated degrees of harmfulness will only increase their values, at times A, B, C the degrees of harmfulness will not exceed the criterion of safety, the activity of the executable file will be recognized as safe, and consequently the safe file will be recognized as safe.

The time of recognizing the file as "suspicious" might not occur after the manifesting of "suspicious" activity, since the described approach affords a smooth growth in the degree of harmfulness, which makes it possible to avoid sharp peaks in the growth of the degree of harmfulness.

Figure 4:
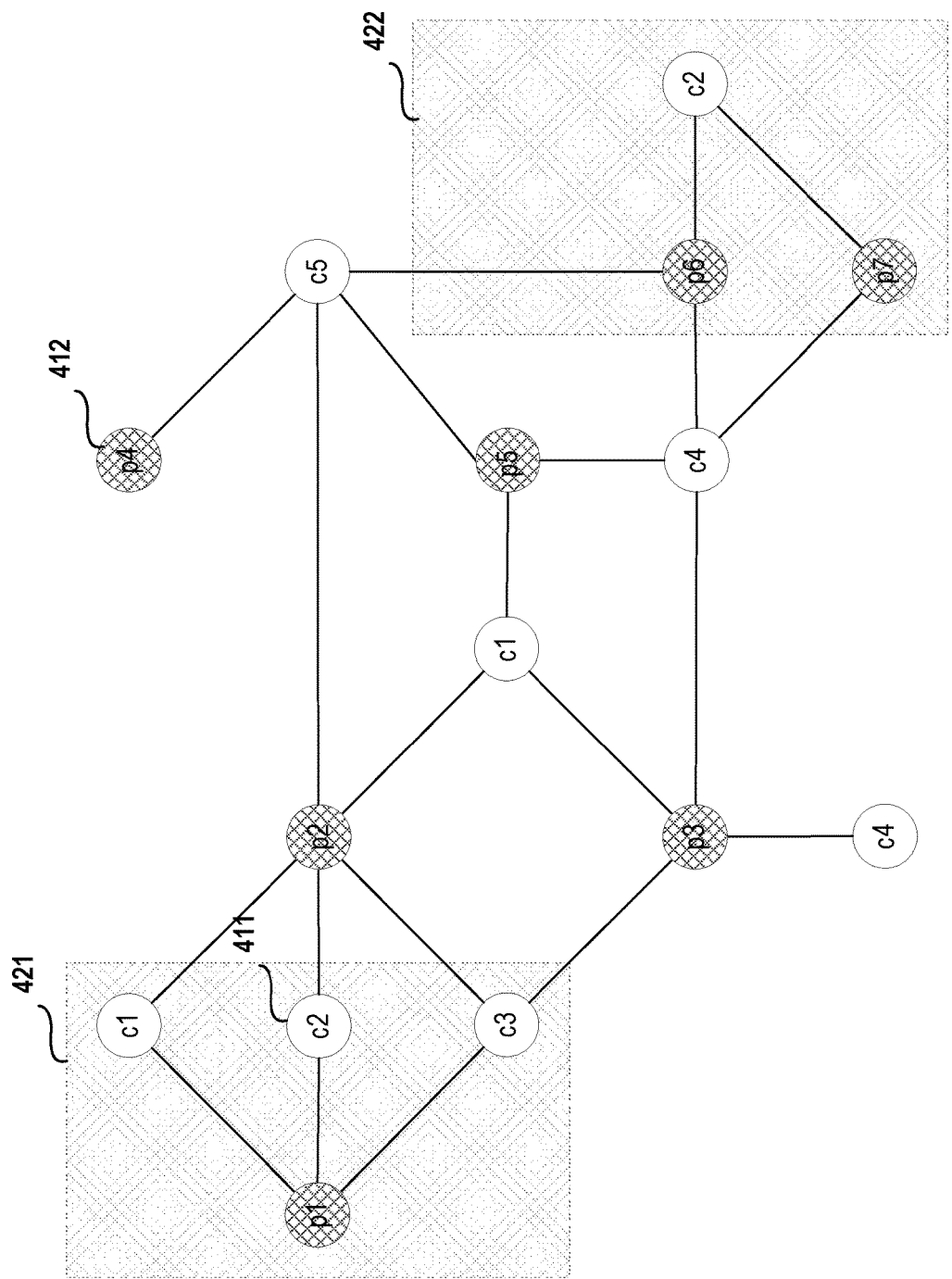
FIG. 4 shows an example of the diagram of relations between the elements of behavior patterns.

FIG. 4 shows an example of the diagram of relations between the elements of behavior patterns.

The example of the diagram of relations between the elements of behavior patterns contains commands 411 (clear circles), parameters 412 (hatched circles), an example of a behavior pattern with one parameter 421, and an example of a behavior pattern with one command 422.

During the execution of a file, the commands 411 were intercepted and the parameters 412 describing them were determined:

```
CreateFile 0x24e0da54 '.dat'
    {c1, p1, p2}
ReadFile 0x24e0da54 '.dat'
    {c2, p1, p2}
DeleteFile 0x24e0da54 '.dat' 'c:\'
    {c3, p1, p2, p3}
CreateFile 0x708a0b32 '.dat' 0x3be06520
    {c1, p2, p3, p5}
WriteFile 0x708a0b32
    {c4, p3}
WriteFile 0x708a0b32 0x3be06520 0x9902a18d1718b5124728f9 0
    {c4, p3, p5, p6, p7}
CopyMemory 0x3be06520 0x9902a18d1718b5124728f9
    {c5, p4, p5, p6}
ReadFile 0x9902a18d1718b5124728f9 0
    {c2, p6, p7}
```

On the basis of the mentioned commands 411 and parameters 412, behavior patterns (421, 422) are formed and the relations between the elements of the behavior patterns are determined.

In a first step, patterns are formed containing one command 411 and one parameter 412 describing that command:

| | |
|---|---|
| {c1, p1} | {c3, p2} |
| {c1, p2} | {c3, p3} |
| {c1, p3} | {c4, p3} |
| {c1, p5} | {c4, p5} |
| {c2, p1} | {c4, p6} |
| {c2, p2} | {c4, p7} |
| {c2, p6} | {c5, p4} |
| {c2, p7} | {c5, p5} |
| {c3, p1} | {c5, p6} |

In the example shown, 19 behavior patterns have been formed on the basis of 8 intercepted commands (with the parameters describing them).

In the second step, patterns are formed which contain one parameter 412 and all the commands 411 which can be described by that parameter 412:

| | |
|---|---|
| {c1, c2, c3, p1} | {c1, c3, c4, p3} |
| {c1, c2, c3, p2} | {c5, p4} |
| {c1, c4, c5, p5} | {c2, c4, p7} |
| {c2, c4, c5, p6} | |

In the example shown, 7 behavior patterns have been formed in addition on the basis of 8 intercepted commands (with the parameters describing them).

In the third step, patterns are formed which contain several parameters 412 and all the commands 411 which can be described by those patterns 412:

| | |
|---|---|
| {c1, c2, c3, p1, p2} | {c2, c4, p6, p7} |
| {c4, c5, p5, p6} | |

In the example given, 3 behavior patterns have been formed in addition on the basis of 8 intercepted commands (with the parameters describing them).

Figure 5:
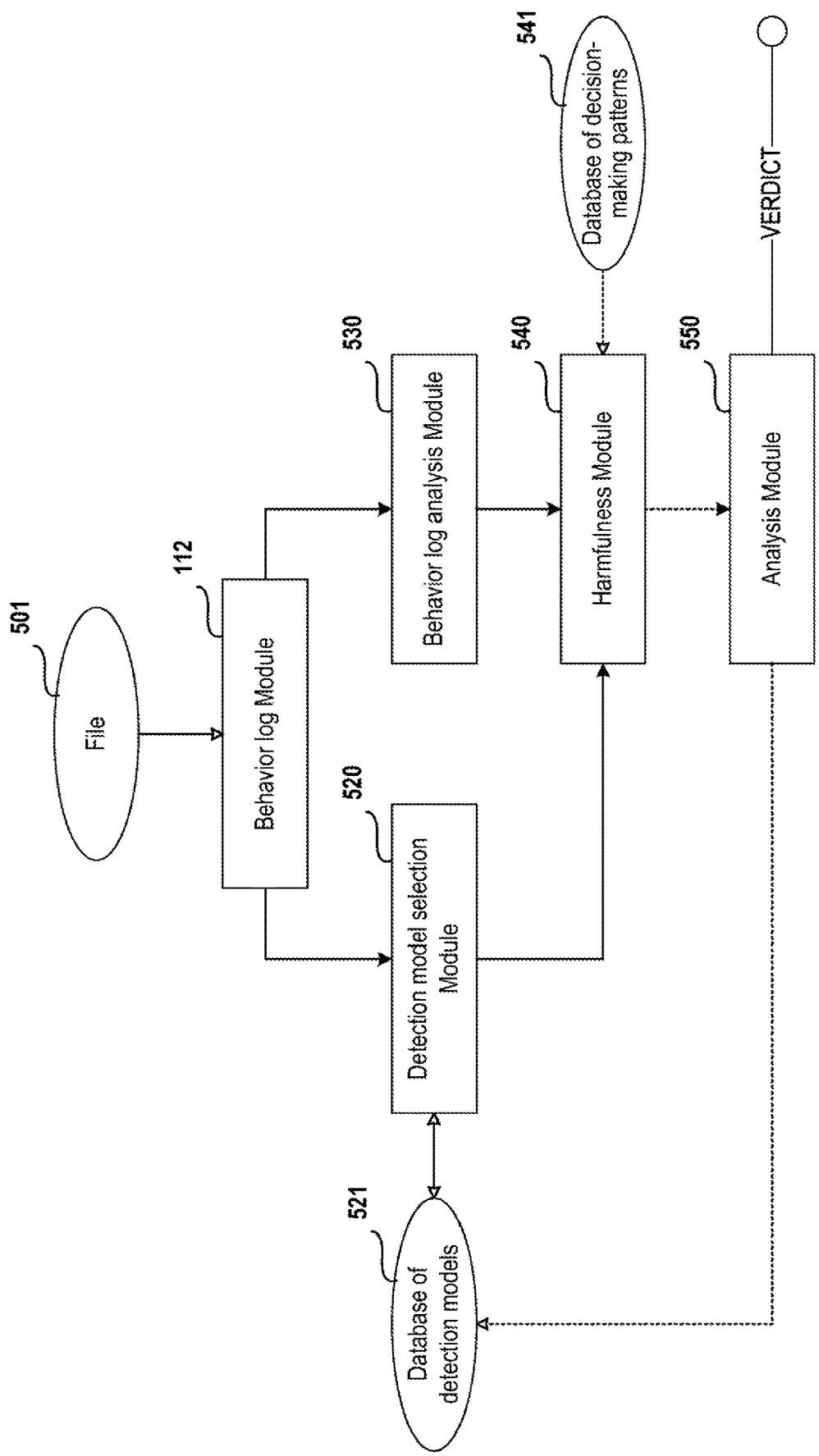
FIG. 5 presents a structural diagram of the system of detecting malicious files by using a trained model for detection for malicious files.

FIG. 5 presents a structural diagram of the system of detecting malicious files by using a trained model for detection of malicious files.

The structural diagram of the system of detecting malicious files by using a trained model for detection of malicious files consists of a file being analyzed 501, a behavior logs module 112, a selection module 520, a database of detection models 521, a behavior log analysis module 530, a harmfulness module 540, a database of decision-making patterns 541 and an analysis module 550.

In one exemplary aspect, said system additionally contains the behavior logs module 112 of a file being executed, which is designed to:
  intercept at least one command at least during:
    the execution of the file 501,
    the emulation of the execution of the file 501;
  determine for each intercepted command at least one parameter describing that command;
  form on the basis of the intercepted commands and the determined parameters a behavior log for that file, the intercepted commands and the parameters describing them being entered into the behavior log in chronological order from the earlier intercepted command to the later intercepted command (hereinafter: entry in the behavior log);
  send the formulated behavior log to the behavior log analysis module 530 and to the selection module 520.

In yet another exemplary aspect, the behavior log is a set of executable commands (hereinafter: command) from the file 501, where each command corresponds to at least one parameter describing that command (hereinafter: parameter).

In yet another exemplary aspect, the intercepting of commands of the file being executed 501 and the determination of the parameters of the intercepted commands are done on the basis of an analysis of the performance of the computing device on which the system of detecting malicious files by using a trained model for detection of malicious files is running, including at least:
  a determination as to whether it is possible to analyze the file being executed 501 for harmfulness (carried out with the aid of the behavior log analysis module 530, the harmfulness module 540 and the analysis module 550) up to the time when the next command will be intercepted;
  a determination as to whether the analysis of the file being executed 501 for harmfulness will result in a lowering of the computing resources of the mentioned computing device below a predetermined threshold value, the resources of the computing device being at least:
    the performance of that computing device;
    the volume of free RAM of that computing device;
    the volume of free space on information storage media of that computing device (such as hard disks);
    the bandwidth of the computer network to which that computing device is connected.

In order to increase the performance of the system of detecting malicious files by using a trained model for detection of malicious files, it may be necessary to analyze a behavior log not containing all the executable commands of the file being executed 501, since the entire sequence of actions carried out to analyze the file 501 for harmfulness takes up more time than the interval between two consecutively executed commands of the file being executed 501.

For example, the commands of the file being executed 501 are carried out (and consequently intercepted) every 0.001 s, but the analysis of the file 501 for harmfulness takes 0.15 s, so that all the commands intercepted during that interval of time will be ignored, and thus it is enough to intercept only every 150th command.

The selection module 520 is designed to:
  select from the database of detection models 521 at least two models for detection of malicious files on the basis of the commands and parameters selected from the behavior log of the file being executed 501, where the model for detection of malicious files constitutes a decision-making rule for determining the degree of harmfulness;
  send all selected models for detection of malicious files to the harmfulness module 540.

In one exemplary aspect, the models for detection of malicious files which are kept in the database of detection models 521 have been previously taught by a method of machine learning on at least one safe file and malicious file.

The model for detection of malicious files is described in further detail in FIG. 1-FIG. 4.

In yet another exemplary aspect, the method of machine learning of the model for detection is at least the method:
  gradient boosting on decision-making trees;
  decision-making trees;
  kNN nearest neighbors;
  support vectors.

In yet another exemplary aspect, the method of teaching the detection model ensures a monotonic variation in the degree of harmfulness of the file in dependence on the variation in the number of behavior patterns formulated on the basis of the analysis of the behavior log.

For example, the calculated degree of harmfulness of the file 501 may only grow monotonically or not change in dependence on the number of behavior patterns formulated on the basis of the analysis of the behavior log of that file 501. At the start of the execution of the file 501, the number of formulated behavior patterns is insignificant, and the computed degree of harmfulness of that file 501 differs little from 0; over time the number of formulated patterns grows and the computed degree of harmfulness of that file 501 also grows, or if there is no malicious activity for that file 501 the computed degree of harmfulness remains unchanged; thus, at whatever moment of execution of a malicious file 501 the degree of harmfulness of the file is computed (or with whatever record of the behavior log the forming of the behavior patterns commences), it will reflect whether or not malicious activity of the file 501 was present up to the moment of computation of said degree of harmfulness.

In yet another exemplary aspect, each model of detection of malicious files selected from the database of detection models 521 is trained for the detection of malicious files with unique, previously determined characteristic features.

For example, the detection models kept in the database of detection models 521 may be trained to detect files:
  having a graphic user interface (GUI);
  exchanging data in a computer network;
  encrypting files (for example, malicious files of the family Trojan-Cryptors);
  using network vulnerabilities for their spreading (for example, malicious files of the family Net-Worms), P2P networks (such as malicious files of the family P2P-Worms) and so forth.

Thus, a malicious file may be detected with the use of several trained models for detection of malicious files. For example, the malicious file WannaCry.exe which encrypts data on a user's computing device during its execution and sends its copies to other computing devices connected to the same computer network as the mentioned user's computing device on which that file is executed can be detected with the help of detection model #1, which is trained to detect files utilizing vulnerabilities, detection model #2, which is trained to detect files designed to encrypt files, and detection model #3, which is trained to detect files containing text information which may be interpreted as presenting of demands (for example, as to a form of payment, funds, etc.). The degrees of harmfulness calculated with the aid of the mentioned models may be different, as may be the moments of time when the calculated degrees of harmfulness exceed the predetermined threshold value. For example, the results of the use of the models for detection of malicious files by means of which it was possible to detect the malicious file 501 may be expressed in the following table:

TABLE #1

| detection model | maximum degree of harmfulness | command No. from the behavior log |
|---|---|---|
| model #1 | 0.95 | 374 |
| model #2 | 0.79 | 288 |
| model #3 | 0.87 | 302 |

The file 501 is recognized as being malicious in the event that the calculated degree of harmfulness exceeds 0.78. The degree of harmfulness (for example, 0.78) here characterizes the probability that the file for which the degree of harmfulness was calculated may prove to be malicious (78%) or safe (22%). If the file 501 can be recognized as being malicious with the use of several models for detection of malicious files, then the probability that the file 501 is malicious will increase. For example, for the models for detection of malicious files used to present the data in Table #1, the total degree of harmfulness may be computed by the formula $$w_{total} = 1 - \Pi_i^n(1-w_i) = 0.999685,$$

where $w_{total}$—is the total degree of harmfulness, $w_i$—is the degree of harmfulness calculated with the use of the model n—is the number of models for detection of malicious files used to compute the total degree of harmfulness.

Thus, the obtained total degree of harmfulness (0.999685) is significantly higher than the predetermined threshold value (0.78) for which a file is recognized as being malicious when exceeded by the calculated degree of harmfulness. That is, the use of several models for detection of malicious files is able to significantly increase the accuracy of the determination of malicious files and reduce the errors of the first and second kind occurring in the detecting of malicious files.

In yet another example, the use of several models for detection of malicious files allows the total degree of harmfulness to reach a predetermined threshold value for which a file is recognized as being malicious when exceeded by the calculated degree of harmfulness much earlier than when using each of the models for detection of malicious files by itself. For example, for the models for detection of malicious files used to present the data in Table #1, provided that the calculated degrees of harmfulness vary monotonically, the number of the command from the behavior log after which the file will be recognized as being malicious may be computed by the formula $$I_{detect} = \Pi_i^n F(w_i, I_i) = 207,$$

where $I_{detect}$—is the number of the command from the behavior log after analysis of which the file is recognized as being malicious, $I_i$—is the number of the command from the behavior log after analysis of which with the use of the model the file is recognized as being malicious, $w_i$—is the degree of harmfulness as computed with the use of the model, n—is the number of models for detection of malicious files used to calculate the number of the command from the behavior log after analysis of which the file is recognized as being malicious.

Thus, the overall number of the command from the behavior log so obtained (207) is significantly less than the earliest number of the command from the behavior log (288) after analysis of which the file was recognized as being malicious by one of the models for detection of malicious files (model #2). That is, the use of several models for detection of malicious files is able to significantly increase the speed (i.e., the efficiency) of the determination of malicious files.

In yet another example, different models of detection which are saved in the database of detection models 521 may be trained for the detection of malicious files with several, not necessarily unique, previously determined characteristic features, i.e., detection model #1 may detect files having a graphic user interface and exchanging data in a computer network, while model #2 may detect files exchanging data in a computer network and spreading through that computer network with the use of network vulnerabilities. Both of these detection models may detect the aforementioned malicious file WannaCry.exe by the common characteristic feature of the file spreading through the computer network by the use of network vulnerabilities.

In yet another exemplary aspect, there is selected from the database of detection models 521 a model for detection of malicious files that was trained on files during the executing of which at least
  i. the same commands were carried out as the commands selected from the behavior log of the file being executed 501;
  ii. the same parameters were used as the parameters selected from the behavior log of the file being executed 501.

For example, from the behavior log the following commands were selected: CreateFileEx, ReadFile, WriteFile, CloseHandle, which are used for the modification of files, including the encryption of files. From the database of detection models 521 there is selected a detection model which was trained for use in the detection of malicious files of the family Trojan-Cryptors.

In yet another example, from the behavior log there were selected the parameters: 8080, 21, describing commands for working with a computer network (such as connect, where the above-described parameters represent ports for connection to an electronic address). From the database of detection models 521 there is selected a detection model which was trained for use in the detecting of files providing for exchange of data in a computer network.

The behavior log analysis module 530 is designed to:
  form at least one behavior pattern on the basis of the commands and parameters selected from the behavior log of the file being executed 501, wherein the behavior pattern represents a set of at least one command and a parameter describing all the commands in that set;
  calculate the convolution of all behavior patterns so formulated;
  send the formulated convolution to the harmfulness module 540 of the file being executed.

In one exemplary aspect, the calculation of the convolution of the formulated behavior patterns is done on the basis of a predetermined convolution function, such that the inverse convolution function of the result of that convolution function on all of the formulated behavior patterns has a degree of similarity with that behavior pattern which is greater than a given threshold value.

The forming and use of convolution functions (calculation of the convolution) are described in greater detail in FIG. 1, FIG. 2.

The harmfulness module 540 is designed to:
calculate the degree of harmfulness of the file being executed 501 on the basis of an analysis of the obtained convolution with the aid of each obtained model for detection of malicious files;
send each calculated degree of harmfulness to the analysis module 550.

In one exemplary aspect, the decision-making pattern represents a composition of degrees of harmfulness.

For example, a composition of the degrees of harmfulness calculated on the basis of models #1, #2, #3, described above, may be represented in the form of a collection of pairs {0.95, 374}, {0.79, 288}, {0.87, 302}.

In yet another example, a composition of the degrees of harmfulness calculated on the basis of models #1, #2, #3, described above, may represent a measure of the central trend of the calculated degrees of harmfulness (for example, the arithmetic average, in the present case 0.87).

In yet another example, a composition of the degrees of harmfulness constitutes a dependence of the change in the degrees of harmfulness on the time or the number of behavior patterns used to calculate the degree of harmfulness.

The analysis module 550 is designed to:
form a decision-making pattern on the basis of the obtained degrees of harmfulness;
recognize the file being executed 501 as malicious if the degree of similarity between the decision-making pattern so formulated and at least one of the predetermined decision-making patterns from the database of decision-making patterns 541, previously formulated on the basis of an analysis of malicious files, exceeds a predetermined threshold value.

In one exemplary aspect, the decision-making pattern represents a collection of degrees of harmfulness obtained from the harmfulness module 540.

In yet another exemplary aspect, the decision-making pattern represents a dependence of the degree of harmfulness on the time or the number of behavior patterns used to calculate that degree of harmfulness.

In yet another exemplary aspect, the decision-making patterns from the database of decision-making patterns 541 are formed on the basis of an analysis of malicious files used for training the models from the database of detection models 521.

For example, on the basis of 100000 files, of which 75000 are safe files and 25000 are malicious files, detection models are trained (including testing) and then saved in a database of detection models 521. After the models for detection of malicious files have been trained, they are used to form decision-making patterns for several (or all) of the aforementioned 25000 malicious files, which are then entered into a database of decision-making patterns 541. That is, a machine teaching of models for detection of malicious files is originally carried out on a teaching and testing sample of files. As a result, it is possible to train several models for detection of malicious files, each of which will be trained for the detection of malicious files with unique, previously determined characteristic features. After all the detection models have been trained, a determination is made as to which of the trained models for detection of malicious files detect certain malicious files (of the aforementioned example of 25000 malicious files); it may turn out that one malicious file can be detected with the use of one set of models for detection of malicious files, another with the use of a second set of models for detection of malicious files, and a third with the use of several models for detection of malicious files from the aforementioned sets of models for detection of malicious files. On the basis of the obtained data as to which models for detection of malicious files can be used to detect which malicious files, decision-making patterns are formulated.

In yet another exemplary aspect, the analysis module 550 is additionally designed to retrain at least one model of detection from the database of detection models 521 on the basis of the commands and parameters selected from the behavior log of the file being executed 501, in the event that the degree of similarity between the formulated decision-making pattern and at least one of the predetermined decision-making patterns from the database of decision-making patterns 541 exceeds a predetermined threshold value, while the degrees of harmfulness calculated with the aid of the mentioned models for detection of a malicious file do not exceed a predetermined threshold value.

Figure 6:
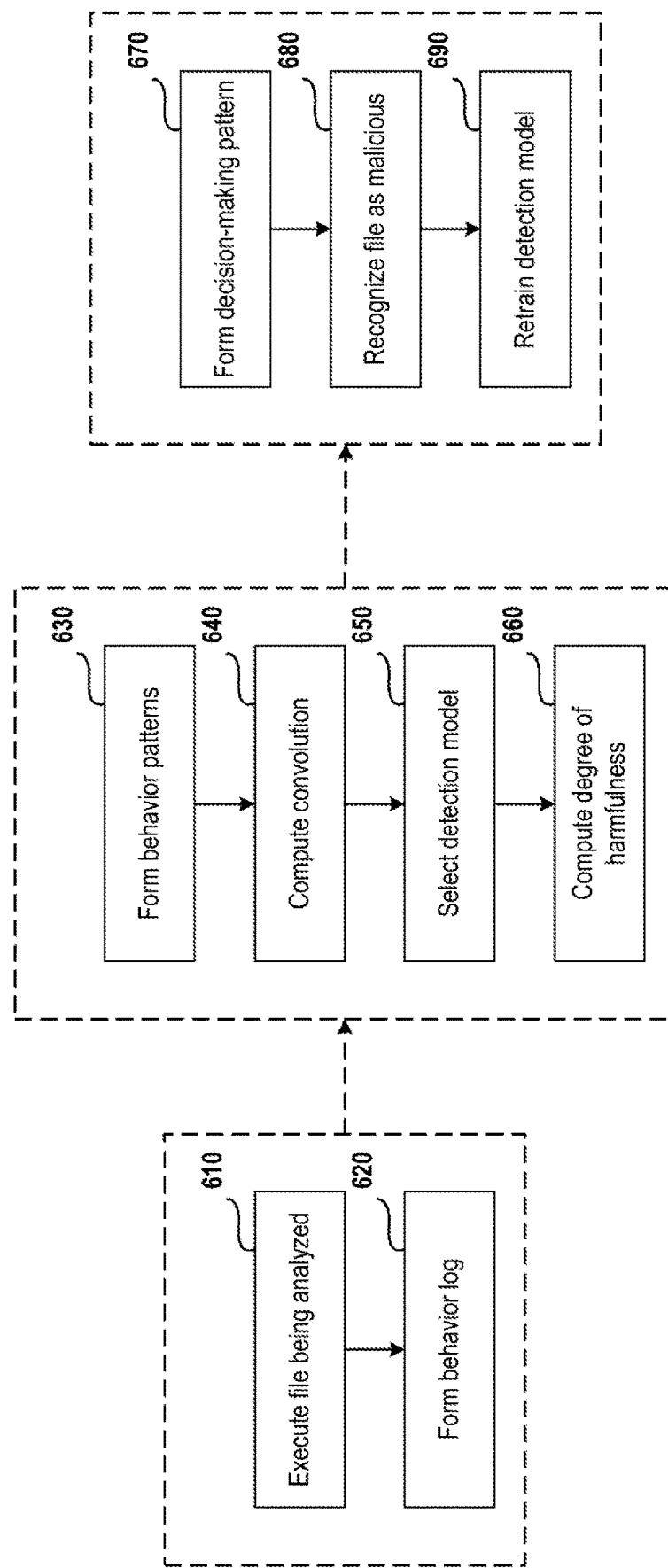
FIG. 6 presents a structural diagram of the method of detecting malicious files by using a trained model for detection of malicious files.

FIG. 6 presents a structural diagram of the method of detecting malicious files by using a trained model for detection of malicious files.

The structural diagram of the method of detecting malicious files by using a trained model for detection of malicious files contains a step 610, in which the file being analyzed is executed, a step 620, in which the behavior log is formed, a step 630, in which the behavior patterns are formed, a step 640, in which the convolution is computed, a step 650, in which a detection model is selected, a step 660, in which the degree of harmfulness is calculated, a step 670, in which a decision-making pattern is formulated, a step 680, in which the file is recognized as being malicious, and a step 690, in which the detection model is retrained.

In step 610 the behavior logs module 112 is used at least to:
execute the file being analyzed 501;
emulate the execution of the file being analyzed 501.

In step 620 the behavior logs module 112 is used to form the behavior log for the file being analyzed 501, for which:
at least one executable command is intercepted;
for each intercepted command, at least one parameter describing that command is determined;
on the basis of the intercepted commands and parameters so determined, the behavior log of that file 501, is formed.

In step 630 the behavior log analysis module 530 is used to form at least one behavior pattern on the basis of the commands and parameters selected from the behavior log of the file being executed 501, wherein the behavior pattern constitutes a set of at least one command and a parameter which describes all the commands of that set.

In step 640 the behavior log analysis module 530 is used to compute the convolution of all the behavior patterns formed in step 630.

In step 650 the selection module 520 is used to select from the database of detection models 521 at least two models for detection of malicious files on the basis of the commands and parameters selected from the behavior log of the file being executed 501, where the model for detection of malicious files represents a decision-making rule for determining the degree of harmfulness.

In step 660 the harmfulness module 540 is used to calculate the degree of harmfulness of the file being executed 501 on the basis of an analysis of the convolution calculated in step 640 with the aid of each model for detection of malicious files selected in step 650.

In step 670 the analysis module 550 is used to form the decision-making pattern on the basis of the degrees of harmfulness obtained in step 660.

In step 680 the analysis module 550 is used to recognize the file being executed 501 as malicious in the event that the degree of similarity between the decision-making pattern formed in step 670 and at least one of the predetermined decision-making patterns from the database of decision-making patterns 541 exceeds a predetermined threshold value.

In step 690 the analysis module 550 is used to retrain at least one detection model from the database of detection models 521 on the basis of the commands and parameters selected from the behavior log of the file being executed, in the event that the degree of similarity between the formulated decision-making pattern and at least one of the predetermined decision-making patterns from the database of decision-making patterns 541 exceeds a predetermined threshold value, and the degrees of harmfulness calculated with the aid of those models for detection of a malicious file do not exceed a predetermined threshold value.

Figure 7:
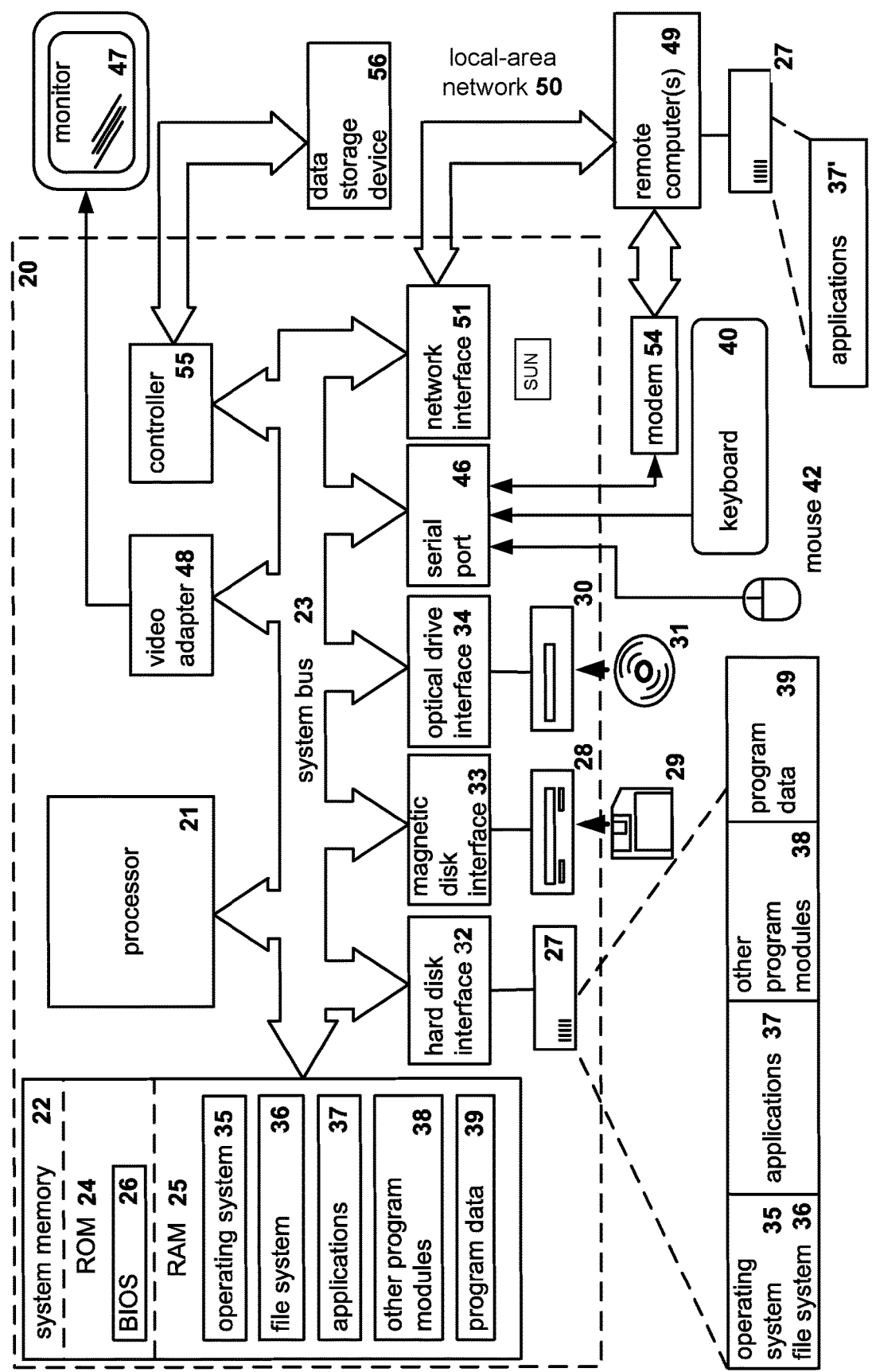
FIG. 7 shows an example of a general-purpose computer system, a personal computer or a server.

FIG. 7 is a diagram illustrating a general-purpose computer system on which aspects of systems and methods for detection of malicious files may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, or the like. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, supra). Accordingly, each module may be realized in a variety of suitable configurations, and should not be limited to any particular implementation exemplified herein.

In the interest of clarity, not all of the routine features of the aspects are disclosed it would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system of detecting malicious files by using at least two models for detection of malicious files, the system comprising:
   a hardware processor configured to:
   form at least one behavior pattern by grouping selected commands with shared parameters from a behavior log of a file being executed, the behavior log comprising a totality of executable commands from the file;
   apply a convolution function on behavior patterns formed to obtain computed parameters;
   select from a database of detection models the at least two models for detection of malicious files, wherein each of the at least two models for detection of malicious files is trained for the detection of malicious files with unique, previously determined characteristic features;
   calculate the degree of harmfulness of the file being executed on the basis of the computed parameters using each of the at least two models for detection of malicious files;
   form a decision-making pattern on the basis of each degree of harmfulness of the file, calculated based on each of the at least two models for detection of malicious files;
   recognize the file being executed as malicious if a degree of similarity between the formulated decision-making pattern and at least one of a predetermined decision-making patterns from a database of decision-making patterns previously formulated based on an analysis of malicious files, exceeds a predetermined threshold value.

2. The system of claim 1, the hardware processor configured to:
   form the behavior logs of the file being executed, which is designed to intercept at least one command at least during execution of the file and to emulate the execution of the file;
   determine, for each intercepted command, at least one parameter describing that command; and
   form, on based on the intercepted commands and the determined parameters, the behavior log of that file.

3. The system of claim 1, wherein the hardware processor is further configured to:
   retrain at least one detection model from the database of detection models on the basis of the selected commands with shared parameters from the behavior log of the file being executed in an event that the degree of similarity between the formulated decision-making pattern and at least one of the predetermined decision-making patterns from the database of decision-making patterns exceeds the predetermined threshold value, and the degrees of harmfulness calculated with the aid of those detection models for a malicious file do not exceed a predetermined threshold value.

4. The system of claim 1, wherein the at least one behavior pattern constitutes a set of at least one command and a parameter describing all commands from the set.

5. The system of claim 1, wherein the model for detection of malicious files constitutes a decision-making rule for determining the degree of harmfulness.

6. The system of claim 2, wherein the hardware processor is further configured to:
   form the at least one behavior pattern by analyzing the behavior log.

7. A method of detecting malicious files by using at least two models for detection of malicious files, the method comprising:
   forming at least one behavior pattern by grouping selected commands with shared parameters from a behavior log of a file being executed, the behavior log comprising a totality of executable commands from the file;
   applying a convolution function on behavior patterns formed to obtain computed parameters;
   selecting from a database of detection models the at least two models for detection of malicious files, wherein each of the at least two models for detection of malicious files is trained for the detection of malicious files with unique, previously determined characteristic features;
   calculating the degree of harmfulness of the file being executed on the basis of the computed parameters and using each of at least two models for detection of malicious files;
   forming a decision-making pattern, on the basis of each degree of harmfulness of the file, calculated based on each of the at least two models for detection of malicious files;
   recognizing the file being executed as malicious if a degree of similarity between the formulated decision-making pattern and at least one of a predetermined decision-making patterns from a database of decision-making patterns previously formulated based on an analysis of malicious files, exceeds a predetermined threshold value.

8. The method of claim 7, further comprising:
forming the behavior logs of the file being executed, which is designed to intercept at least one command at least during execution of the file and to emulate the execution of the file;
determining, for each intercepted command, at least one parameter describing that command; and
forming, on based on the intercepted commands and the determined parameters, the behavior log of that file.

9. The method of claim 7, further comprising:
retraining at least one detection model from the database of detection models on the basis of the selected commands with shared parameters from the behavior log of the file being executed in an event that the degree of similarity between the formulated decision-making pattern and at least one of the predetermined decision-making patterns from the database of decision-making patterns exceeds the predetermined threshold value, and the degrees of harmfulness calculated with the aid of those detection models for a malicious file do not exceed a predetermined threshold value.

10. The method of claim 7, wherein the at least one behavior pattern constitutes a set of at least one command and a parameter describing all commands from the set.

11. The method of claim 7, wherein the model for detection of malicious files constitutes a decision-making rule for determining the degree of harmfulness.

12. The method of claim 8, further comprising:
forming the at least one behavior pattern by analyzing the behavior log.

13. A non-transitory computer medium having instructions stored thereon for detecting malicious files by using at least two models for detection of malicious files, the instructions comprising:
forming at least one behavior pattern by grouping selected commands with shared parameters from a behavior log of a file being executed, the behavior log comprising a totality of executable commands from the file;
applying a convolution function on behavior patterns formed to obtain computed parameters;
selecting from a database of detection models the at least two models for detection of malicious files, wherein each of the at least two models for detection of malicious files is trained for the detection of malicious files with unique, previously determined characteristic features;
calculating the degree of harmfulness of the file being executed on the basis of the computed parameters using each of the at least two models for detection of malicious files;
forming a decision-making pattern, on the basis of each degree of harmfulness of the file, calculated based on each of the at least two models for detection of malicious files;
recognizing the file being executed as malicious if a degree of similarity between the formulated decision-making pattern and at least one of a predetermined decision-making patterns from a database of decision-making patterns previously formulated based on an analysis of malicious files, exceeds a predetermined threshold value.

14. The medium of claim 13, the instructions further comprising:
forming the behavior logs of the file being executed, which is designed to intercept at least one command at least during execution of the file and to emulate the execution of the file;
determining, for each intercepted command, at least one parameter describing that command; and
forming, on based on the intercepted commands and the determined parameters, the behavior log of that file.

15. The medium of claim 13, the instructions further comprising:
retraining at least one detection model from the database of detection models on the basis of the selected commands with shared parameters from the behavior log of the file being executed in an event that the degree of similarity between the formulated decision-making pattern and at least one of the predetermined decision-making patterns from the database of decision-making patterns exceeds the predetermined threshold value, and the degrees of harmfulness calculated with the aid of those detection models for a malicious file do not exceed a predetermined threshold value.

16. The medium of claim 13, wherein the at least one behavior pattern constitutes a set of at least one command and a parameter describing all commands from the set.

17. The medium of claim 13, wherein the model for detection of malicious files constitutes a decision-making rule for determining the degree of harmfulness.

18. The medium of claim 14, the instructions further comprising:
forming the at least one behavior pattern by analyzing the behavior log.

* * * * *